(12) United States Patent
Wagner et al.

(10) Patent No.: US 7,107,608 B2
(45) Date of Patent: Sep. 12, 2006

(54) REMOTE TASK SCHEDULING FOR A SET TOP BOX

(75) Inventors: Mark Wagner, Seattle, WA (US); Paul J. Roy, Menlo Park, CA (US); Aaron DeYonker, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1205 days.

(21) Appl. No.: 09/968,486

(22) Filed: Oct. 1, 2001

(65) Prior Publication Data

US 2003/0066092 A1   Apr. 3, 2003

(51) Int. Cl.
G06F 3/00 (2006.01)
H04N 7/173 (2006.01)
H04N 7/16 (2006.01)

(52) U.S. Cl. .................. 725/110; 725/86; 725/112; 725/115; 725/131; 725/139

(58) Field of Classification Search .............. 725/38, 725/39, 51, 115, 132, 139, 86, 110, 112, 114, 725/131, 145, 151; 709/208, 221, 222; 348/553, 348/563
See application file for complete search history.

(56) References Cited

U.S. PATENT DOCUMENTS 6,177,931 B1 * 1/2001 Alexander et al. ............ 725/52
6,388,714 B1 * 5/2002 Schein et al. ................ 348/563
6,721,954 B1 * 4/2004 Nickum ........................ 725/46
6,732,158 B1 * 5/2004 Hesselink et al. ........... 709/208
2003/0005446 A1 * 1/2003 Jaff et al. ...................... 725/51

FOREIGN PATENT DOCUMENTS

| EP | 1 146 737 A1 | 10/2001 |
| WO | WO 01/45407 A1 | 6/2001 |
| WO | WO 01/61997 A1 | 8/2001 |
| WO | WO 01/65862 A2 | 9/2001 |

OTHER PUBLICATIONS

DeYonker, Aaron; Remote DVR Functional Spec, Mercury 1.1, Section 13, Mar. 11, 2001, 5 pgs.

* cited by examiner

Primary Examiner—Kieu-Oanh Bui
(74) Attorney, Agent, or Firm—Workman Nydegger (57) ABSTRACT

Systems and methods for remotely scheduling tasks that are transmitted to a set top box and implemented on the set top box. A task service includes a website that provides program guide data to users. From the program guide data, a user selects a task. The website generates a notification that includes the task and certain identifiers, including a set top box identifier and a sequence number. The notification is sent to a notification service, that repeatedly sends the notification to a broadcast service. The broadcast service ensures that the notification is transmitted to the set top box. The set top box detects the notification from the set top box identifier and implements the task on the set top box unless the task has been previously handled.

41 Claims, 3 Drawing Sheets

REMOTE TASK SCHEDULING FOR A SET TOP BOX

BACKGROUND OF THE INVENTION

1. The Field of the Invention

The present invention relates to systems and methods for remotely scheduling tasks for a set top box. More particularly, the present invention relates to systems and methods for remotely requesting tasks and for remotely scheduling tasks that are transmitted over a satellite system to a set top box.

2. Background and Related Art

Consumers are beginning to have access to a large number of television programs over an increasing number of television channels. Set top boxes such as satellite receivers, cable boxes, and digital video recorders or combinations thereof are becoming more popular because they provide features to consumers that were not previously available. Set top boxes, for example, allow users to digitally record programming content such as television programs, lock certain channels from being accessed without permission, view electronic program guide data, and set personal preferences that control how the program guide data and/or the programming content is presented to the user.

These features are available to a user who, from the comfort of their own home, can easily program the set top box to perform these tasks. The ability to digitally record a television program is particularly useful when users are unable to view a particular television program during the scheduled broadcast of the program. For example, there may be more than one program that the user wants to watch that are broadcast at the same time, or the user may be away from home when the program the user wants to watch is broadcast.

Sometimes, the user knows that he or she will be unable to view a certain television program well in advance. This may occur, for example, when the user is planning a vacation. In this instance, the user is able to directly program the set top box from their home to record the program before they leave on vacation. When the program is broadcast while the user is on vacation, the television program will be recorded by the programmed set top box and the user will be able to view the program at their leisure.

Unfortunately, there are situations where the user is away from home and their set top box is not programmed to record a certain program. A user, for instance, may leave on vacation without programming their set top box. In other situations, a user may desire to record a program shortly before the program is scheduled to begin. For example, a user, while at a sporting venue, may discover that their favorite program is going to be a new episode instead of a repeat episode.

More generally, there are many reasons why a user is unable to record a television program. The fact that the user may be at work, cannot get home in time to record the television program, has another commitment that conflicts with the television program, forgot to program the set top box, and the like are some of the reasons that prevent a user from successfully recording a program. Thus, users often find themselves in situations that prevent them from successfully recording the desired program.

In order to schedule a task, such as recording a television program, many set top boxes simply require the presence of the user. Thus, users are unable to access their set top boxes from a remote location such that a task can be scheduled at the set top box. Attempts have been made, however, to provide a way for users to record programs or schedule tasks when they do not have direct access to their set top box.

One attempt involves using a proprietary server that stores program guide data. Periodically, the set top box will access the proprietary server in order to update the program guide data stored in the set top box. To schedule a task in this case, the user accesses the proprietary server through a network, such as the Internet. Once logged on to the proprietary server, the user may view the program guide data stored on the proprietary server and input programming instructions or schedule a task that will be downloaded to the set top box of the user.

The primary problem is that the set top box con only access the proprietary server periodically, which may introduce a large delay into the creation of a task. The user must simply wait until the set top box logs in at a later time before the task will be downloaded. In many circumstances, especially when a task is scheduled on short notice, the set top box will not record the television program because it either did not receive the task or received the task too late.

The problem of ensuring that a user is able to remotely schedule a task is also complicated because many of the broadcasts through which television programming is delivered are unidirectional transmissions. A satellite, for example, does not receive data from a set top box. Rather, the satellite is broadcasting programming content that can be a received by all of the set top boxes that are tuning to the satellite's broadcast. The lack of a return channel eliminates the possibility of remotely accessing the set top box.

While many set top boxes have a dial up connection that, in many cases, serves as a return channel, the user is not able to remotely cause the set top box to establish the return channel. The set top box is able to receive data over the satellite broadcast, but the dial up connection is only used as needed. Thus, there is a need in the art for systems and methods that allow a user to remotely schedule tasks that can be implemented on a set top box.

SUMMARY OF THE INVENTION

These and other problems are addressed by the present invention which provides systems and methods for remotely scheduling tasks that are implemented on a set top box. Remotely scheduling a task begins with a task service that allows a user to access program guide data using an access device. After the task selected by the user has been received by the task service, the task is transmitted to a set top box over a system such as a satellite system. The set top box detects the transmitted task and implements or schedules the task on the set top box.

The task service maintains program guide data that is often provided to users from a website that users may access over a network such as the Internet. The task service also provides users with access to program guide data over an automated, voice activated telephone system. A user is able to select or schedule a task, such as a record task, using the provided program guide data from the website or from the telephone system. After the task is scheduled or identified at the task service, the task service generates a notification that includes the data required to effectively identify or define the task. The notification is then broadcast or sent to the set top box over a transmission such as satellite broadcast. A notification service resends the notification according to a pre-determined schedule to insure that the notification is received by the set top box.

The set top boxes that receive the broadcast detect the notification as it is broadcast over the satellite broadcast by examining or detecting a set top box identifier included in the notification. The set top box, however, only pays attention to those notifications that are intended for that set top box, which is determined by the set top box identifier. The relevant notifications are processed by the set top box such that the task is scheduled on the set top box. Because the notifications are repeatedly sent to the set top box, a sequence number is typically included in the notification such that the set top box can determine whether the task has already been processed. In this manner, a user is able to remotely schedule a task that will be implemented or scheduled on his or her set top box.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to systems and methods for remotely scheduling a task that can be scheduled on a set top box or on a client system. In particular, the present invention allows users to access a website that provides program guide data and request a task using the provided program guide data. The task, after it has been remotely requested or scheduled, is communicated to the set top box using, for example, satellite bandwidth, or other network connections such as Ethernet. The set top boxes detect the notifications and implement the remotely requested tasks.

The embodiments of the present invention may comprise a special purpose or general purpose computer including various computer hardware, as discussed in greater detail below. Set top boxes that enhance the capabilities of conventional televisions represent an example of a special purpose computer. Exemplary set top boxes include, but are not limited to, satellite receivers, cable boxes, digital video recorders, video cassette recorders, and the like and any combination thereof. Thus, a satellite receiver coupled with a digital video recorder, as separate boxes or as an integral unit, is within the scope of a set top box. The embodiments may further comprise multiple computers linked in a networked environment.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The present invention is described herein with reference to a satellite system or other systems that have a one way transmission, broadcast or communication channel, but can be applied in other systems including cable television systems where a bi-directional transmission or communication channel may exist.

Figure 1:
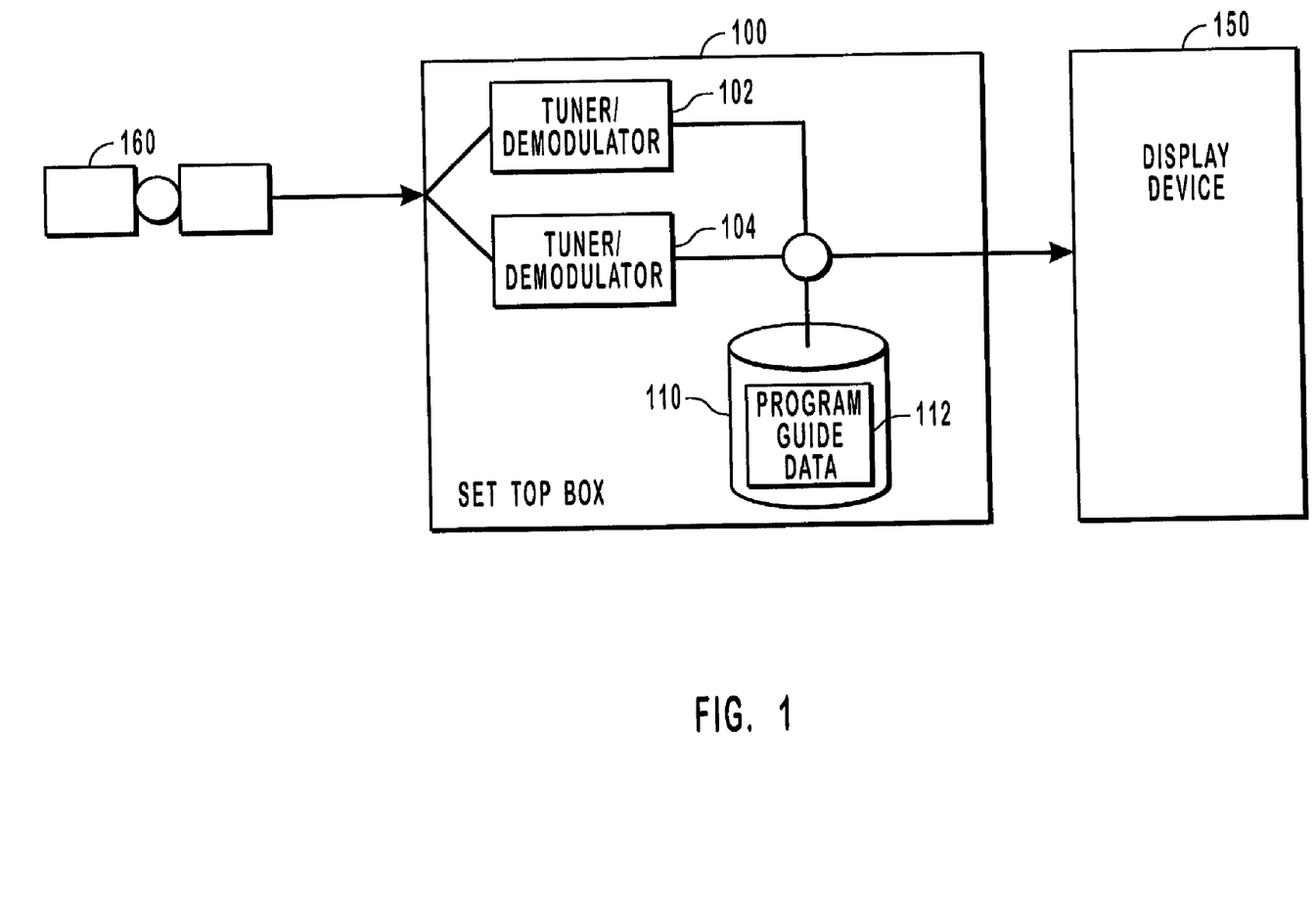
FIG. 1 illustrates an exemplary set top box in which the systems and methods of the present invention may be implemented.

FIG. 1 is a block diagram that generally illustrates a set top box that is used in a satellite system. In this, example, a single satellite 160 is illustrated, but it is understood that other satellites may be available and that the set top box 100 can receive broadcasts from different satellites. The satellite 160 typically has several broadcast frequencies or transponders. The number of channels that are assigned to each transponder is dependent on many factors, including, but not limited to, the image quality, the frame rate of the source material, the amount of movement in the source material, the amount of error correction overhead, and the like.

In addition to carrying multiple channels, the broadcast of each transponder may include electronic programming guide data, conditional access data, and other digital data. The broadcast of the satellite 160 is received at the set top box 100 and processed such that the data or channels may be viewed on the display device 150, which is usually a television set.

In this example, the set top box 100 includes a tuner unit 102 and a tuner unit 104. Each tuner unit typically includes a tuner, a demodulator, and a transport. The tuner tunes to a particular transponder of the satellite 160 to receive the corresponding broadcast or programming content of the particular transponder. The demodulator produces a transport stream, which typically represents multiple channels, from the tuned broadcast. The transport stream typically includes audio, video and data packets for multiple channels but may also include program guide data, conditional access data, and the like. The transport separates a single video stream or channel from the transport stream. Each tuner unit may be used to view a particular channel.

The set top box 100 also includes a storage device 110. After a video stream or channel is produced, it can be rendered on the display device 150 and/or recorded on the storage device 110. Because the set top box 100 has more than one tuner, it is possible that one channel or program can be displayed on the display device 150 while another channel or program is being recorded on the storage device 110. The second tuner can also tune to a transponder over which remotely requested or scheduled tasks may be received.

The present invention can be practiced in set top boxes that have a single tuner, but it is useful to have an additional tuner in the set top box. One reason is that an additional tuner can more easily tune to the transponder that carries remotely scheduled tasks. A tuner that is used while watching a program cannot tune to the appropriate transponder and it is therefore possible that a remotely requested task will not be scheduled because it was not detected by the set top box.

The storage device 110 is also used to store program guide data 112. The program guide data 112 may be included in the broadcast of the satellite 160, but it can also be received through, for example, a dial up connection through a network such as the Internet. In either case, the program guide data 112 stored locally on the set top box 100 is usually specific to the set top box 100. In other words, the program guide data 112 may be related to any subscriptions of a user as well as to any user preferences that have an effect on how the program guide data 112 is stored and/or displayed.

Program guide data typically includes information about the programs and channels being broadcast by the satellite 160. Program guide data 112 may include, but is not limited to, program start times, program end times, program durations, program ratings, program reviews, program descriptions, program titles, program show dates, and the like. The program guide data 112 also serves as a schedule for programs that will be broadcast in the future and is similar to a program listing that may be found in newspapers, for example.

As used herein, "task" refers to actions that occur or may be scheduled on a set top box and include, but are not limited to, recording a program, deleting a program, setting preferences, changing or altering existing tasks, locking a channel and/or a program, and the like. Tasks are implemented at the set top box and can occur immediately or can be scheduled to occur at a later time. Task also refers to events or operations that are scheduled to be performed by the set top box.

Figure 2:
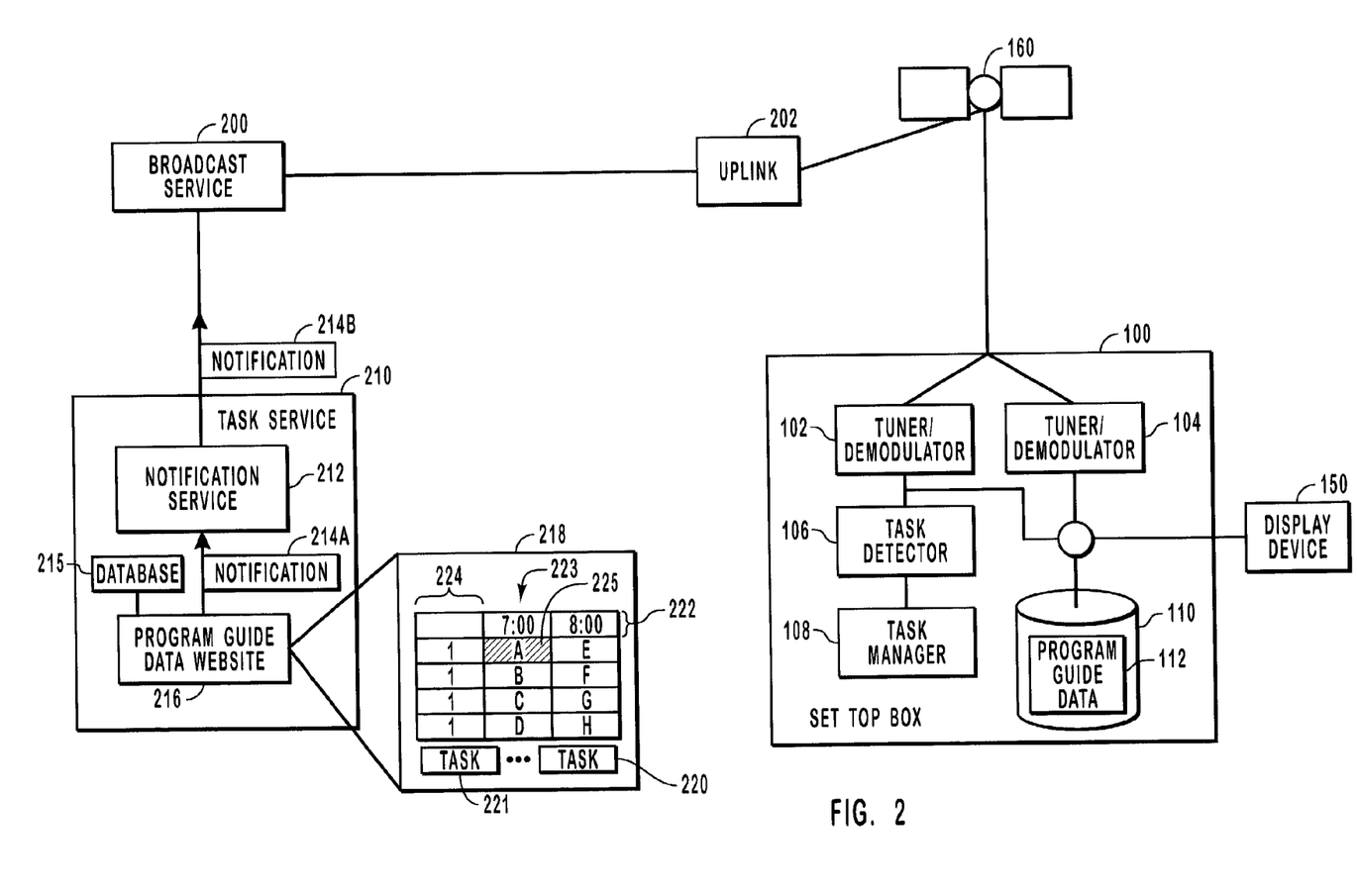
FIG. 2 is a block diagram that illustrates how a remote task is generated and delivered to a set top box where it is implemented.

FIG. 2 is a block diagram that illustrates an exemplary system in which a user may remotely schedule a task for a set top box. In order to schedule a remotely requested task, the set top box 100 is first enabled to receive and process remotely requested tasks. Enabling the set top box 100 often requires the user to register with a task service 210 or a website 216 such that the user receives a user identifier. During registration, the user will also supply a set top box identifier to the task service 210, such as a serial number or other identifier that is unique to the set top box. Alternatively, a user can use a user identifier that is issued from an authentication service that uniquely identifies the user to many different websites.

When the task service 210 is accessed over the telephone, a user identifier will be entered that may be different from the user identifier supplied by the authentication system. For example, the user identifier in this instance may be a telephone number of the user because the telephone number can also uniquely identify the user and/or the user's set top box. Thus, the principles discussed herein can be applied to a system where the task service is accessed by telephone instead of over a network such as the Internet.

The set top box identifier is stored by the task service 210 and is used by the task service when a task is requested or scheduled as will be described later. After the set top box 100 is enabled, the set top box 100 has the ability to accept remotely generated or scheduled tasks, such as record tasks. After accepting a remotely scheduled task, the set top box 100 schedules the task and in some instances, performs conflict resolution while scheduling the task at the set top box 100.

Remotely scheduling a task begins with the task service 210 that includes a website 216. The website 216 is a website that provides program guide data to users or subscribers. Usually, the program guide data is accessed over a network such as the Internet. Accessing the website 216 typically requires a user identifier (such as a user name and/or a password) that was obtained, for example, when the set top box 100 was enabled for remotely scheduled tasks.

A user can access the website 216 and have the program guide data provided by the website 216 displayed on their access device 218, which may be a desktop computer, a laptop computer, a cellular telephone, an Internet appliance, and the like. The program guide data that is provided by the website 216 to a user is often customized by the user and/or dependent on a subscription plan of the user.

FIG. 2 further illustrates an example of how the program guide data may be displayed to a user. The program guide data 223 is usually displayed in a table format, but it is understood that the format will be changed to accommodate the display capabilities of the access device 218. In this example, a row 222 displays a time that indicates when a particular program will occur. The program guide data 223 displayed to a user also has a column 224 that identifies the channel that is showing the various programs during the times indicated by the row 222.

The user is able to use the program guide data 223 displayed on the access device 218 to remotely select, request or schedule a task. In this example, the program 225 has been selected, for example by a mouse click, and is shaded. In this example, multiple task buttons, represented by a task button 221 and a task button 220, are presented to the user. For example, the task button 220 may be a record button that, when selected or clicked by a user, would ultimately cause the program 225 to be recorded by the set top box 100. Alternatively, the task button 221 could be a delete button that would cause the selected program 225 to not be recorded on the set top box 100. Typically, a task button is presented to the user for each potential task that can be selected or requested using the program guide data that is displayed on the access device 218. Alternatively, a user has the option of scheduling a manual record task. In this instance, the user can identify a start time, an end time, and a channel to be recorded. It is understood that tasks can be identified in other ways from the data presented by the website 216.

Remotely scheduling a task thus begins when a user retrieves program guide data from the website 216. After the user has selected or scheduled a task using the program guide data that is displayed on the access device, the selected or requested task is sent back to the website 216. Next, the website 216 generates a notification 214A that is sent to a notification service 212.

The notification 214A, which represents the task selected or scheduled by a user, is usually sent to the notification service 212 using standard protocols and XML. The content of the notification 214A reflects the task that was scheduled or selected by the user. For example, a notification 214A may include or identify a time, a channel, and a duration of the task. These attributes can usually be determined automatically by the website 216 as they are inherent in the program guide data 223. For example, if a user selects the program 225, the time, channel, and duration of the program 225 are known. In some instances, the task is not limited to the length of a particular program, but the user can manually designate a duration.

The notification 214A may also include other information that is used to describe attributes of the remotely scheduled task. The attributes can be set to default values or can have no effect unless indicated by the user. For example, the notification can identify an extension attribute, which indicates how long the task should be extended beyond the scheduled end time. This may be useful, for example, when recording a sporting program, which does not usually conform to a pre-determined duration or to the duration indicated by the program guide data 223. A baseball game, for example, may extend into extra innings. Another attribute is a keep attribute that identifies how long the task should be stored by the set top box. In one example, this provides an expiration time for the task.

Another attribute is a conflict resolution attribute. For example, it is possible that the task being sent to the set top box 100 will conflict with a task that is already scheduled. The conflict resolution attribute can be used to determine how to handle a conflict between the task currently being scheduled and any previously existing tasks. There is also an destination attribute that indicates where the task should occur. For example, a user may have both a VCR and a DVR and the destination attribute can be used in a record task to designate which set top box will record the program identified by the task. Another attribute is a reminder attribute that enables the set top box to scroll data across the screen as a reminder to the user that their program is being shown but not recorded, thus providing a reminder to the user about whether or not to record the program, for example.

Because a satellite broadcast is typically transmitted to multiple set top boxes, a set top box needs to be able to identify those notifications that are intended for that set top box. This is accomplished by including identifiers in the notification that can be recognized by the set top box. Thus, unique user identifiers, set top box identifiers, or other identifiers can be used to ensure that the appropriate set top box receives its notifications. In one example, the notification 214A, in addition to identifying and defining the selected task, also includes a set top box identifier and a sequence number. When a user logs on or accesses the website 216, a user identifier is supplied to the website 216 (by either the user or an authentication service) and the set top box identifier is determined by mapping the user identifier to the set top box identifiers that are stored in a database 215 that is maintained by the website 216. This allows the website 216 to include the appropriate set top box identifier in the notification 214A such that the task will ultimately be scheduled by the intended recipient of the notification 214A.

After the set top box identifier has been determined, the set top box identifier is added to the notification 214A that is delivered to the notification service 212. The website 216 also includes a sequence number in the notification 214A that is used by the set top box to determine, for example, if the task has already been processed by the set top box 100. Each unique task receives a different sequence number. The website 216 packages these identifiers (the set top box identifier and the sequence number) with the notification 214A and sends the notification 214A to the notification service 212. In some instances, the box identifier and/or the sequence number are encrypted as well. Alternatively, the set top box identifier and/or the sequence number can be inserted into the notification 214A by the notification service 212 instead of the website 216. In some instances, the user identifier is also included in the notification. In other instances, only the set top box identifier is included in the notification.

The notification service 212 stores all of the notifications received from the website 216 in a database. The notification service 212 is responsible for sending the notifications to a broadcast service 200, which delivers the notification 214B (which is the same as notification 214A but is numbered differently for clarity) to the satellite uplink 202. The satellite uplink 202 integrates the notification 214B into the data that is sent to the satellite 160 which, in return, broadcasts the notification 214B to the set top box 100.

As previously stated, the set top box 100 has two tuners and the set top box 100 is therefore capable of tuning to two transponders of the satellite 160 simultaneously. In this example, the notification 214B will be sent over a particular transponder of the satellite 160 and one of the tuners will tune to this transponder in order to receive the notification. The notification service 212 will resend the notification 214B according to a pre-determined schedule. This is advantageous because it is possible that neither of the tuners will be tuned to the correct transponder at a given time. Repeatedly sending the notifications increases the likelihood that the set top box will receive and process the tasks that are included in the notifications.

Alternatively, it is possible to replicate the remotely scheduled tasks on all transponders. This ensures that the set top box receives the remotely scheduled task even if the tuner is tuned to audio and video. The transponder tuned by the second tuner is dependent on how the remotely scheduled tasks or notifications are transmitted in the satellite system. For example, the remotely scheduled task (notification) can be sent on a particular transponder, in which case the second tuner will tune to that transponder according to a predetermined schedule (every hour, every 2 hours, etc.) If the task notification is sent all transponders, then the second tuner may more easily detect the task notification.

The notification 214B can be sent by the notification service 212 according to a pre-determined schedule, at constant intervals, or other schemes and schedules. For example, the notification service 212 may send the notification 214B to the broadcast service 200 immediately after it is received from the website 216. The notification service 212 may then resend the notification 214B according to the following exemplary schedule: after two minutes, after four minutes, after 8 minutes, after 16 minutes, and the like until the task expires or for a pre-determined time period. Instead, the notification can be sent every 5 minutes until the task in the notification expires or for a pre-determined time period. Alternatively, the frequency or schedule with which a notification is sent may also increase as the start time for a particular task approaches. In general, any scheme or schedule can be implemented with regard to how often the notifications are sent by the notification service 212.

In any case, the notification 214B is repeatedly resent to provide more assurance that the set top box 100 receives the task that is packaged in the notification 214B because it is possible that none of the tuners of the set top box are tuned to the appropriate transponder. For each notification, there is usually a point where the notification service 212 ceases to resend the notifications. For example, the notifications can expire or the task included in the notifications may become invalid because the program associated with the task has already finished.

After the tuner unit 102 tunes to the transponder that carries the notifications, the task detector 106 is responsible for identifying tasks or notifications that are intended for the set top box 100. As previously indicated, each notification contains a sequence number and a set top box identifier. The sequence number is different for different tasks, but notifications that are repeated for a particular task retain the same sequence number. Thus, the original notification for a certain record task has the same sequence number as do the notifications that are repeats of the original notification. The sequence number changes when the task changes or when a new task is requested. This allows unique tasks or notifications to have a unique combination of the sequence number and the set top box identifier. If the notification does not include the sequence number, then the task may be processed multiple times at the set top box.

The task detector 106 thus filters the tuned broadcast according to the set top box identifier and/or the sequence number. When the task detector 106 of the set top box 100 detects a notification, then the task in the notification is scheduled by the task manager 108. If the set top box filters a notification that has already been scheduled as determined from the set top box identifier and the sequence number, then that notification is ignored because it is a repeat of a previous notification that has already been processed by the set top box 100.

The task detector 106 may also filter by attributes or other data. This is useful, for example, when a notification is being sent to a group of set top boxes (federation). All of the set top boxes in the federation will be able to process the task in this instance. For example, the set top box users may express interest in a particular program. The notification can be addressed to this federation such that the program in which interest was expressed is recorded as described herein. Alternatively, other tasks can be remotely scheduled for a federation using attributes, telephone numbers, cities, and the like.

The task detector 106 can also filter according to other factors that are related to enabling the set top box 100. One factor is whether the user has a subscription to use this capability of remotely scheduling tasks. If the subscription plan of the user does not include remotely scheduled tasks, then the task detector 106 is effectively disabled. Another factor is whether the user has enabled the ability to remotely schedule tasks by affirmatively declaring that he or she wishes to receive remotely scheduled tasks.

In some instances, the user is required to have more than one tuner, although the systems and methods described herein can be implemented on a single tuner, but it is more difficult to ensure that the set top box will schedule the task because a single tuner may not be able to tune to the appropriate transponder and/or there may not be enough bandwidth on other transponders to include the task.

Assuming that the user has a subscription and that the user has enabled remote tasks, although neither aspect is required for the present invention, the task detector 106 examines the broadcast from the satellite 160 looking for the notifications that are intended for the set top box 100. The notifications that have the correct set top box identifier are handled or processed by the task manager 108 and scheduled or implemented.

Figure 3:
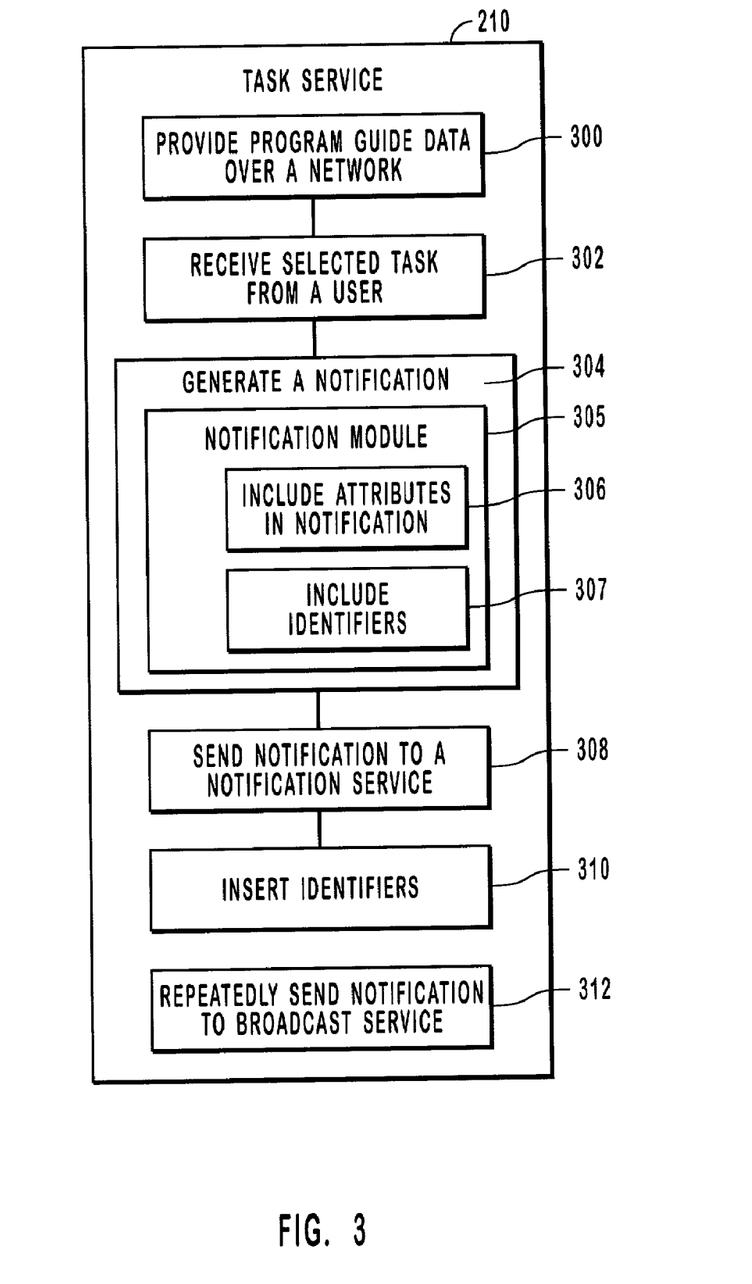
FIG. 3 is a block diagram that illustrates a task service for remotely requesting and scheduling a task.

FIG. 3 is a block diagram that illustrates a task service that permits a task to be prepared or requested for implementation or scheduling on a set top box. After a user has logged on to the task service 210, the task service (or a website) provides (300) program guide data to the user over a network such as the Internet. The user is able to select or request a task using the provided program guide data and the request or the selected task is received (302) by the task service 210 from the user.

From the requested task, a notification is generated (304) and the notification includes information that is needed by the set top box to implement or schedule the task. A notification module 305 is used generate the notification in part by inserting attributes (306) and identifiers (307) in the notification. Some of the attributes, such as a channel, a time, and a duration can be determined from the selected task because they are inherent in the program guide data and are discovered as the user requests the task. Other attributes, however, may have to be supplied by the user and these attributes are may also be included in the notification. Alternatively, the task may be a cancel task, in which a previously created record task or other task is canceled. In this instance, the user may simply identify the previously created record task and select cancel.

The notification module 305 inserts, for example, a set top box identifier, a sequence number, and/or a user identifier in the notification. The set top box identifiers are stored in a database that may be accessed by either the website or by a notification service. The database can be a part of the task service or can be remotely located from the task service such that the set top box identifiers are retrieved over a network, for example. When a set top box identifiers is maintained or retrieved by the website, the set top box identifier that is associated with a user identifier is included in the notification that is sent to the notification service by the website. A sequence number is also included in the notification. In this case, the notification service is responsible for causing the notification to be repeatedly sent to a broadcast service according to a schedule.

Alternatively, the notification service may be responsible for maintaining or accessing the database that stores the set top box identifiers. In this case, the notification service is able to determine and insert the relevant identifiers into the notification. After the notification is thus prepared, it is sent (312) to a broadcast service for transmission to the set top box.

Another aspect of the present invention is related to insuring that a user that purports to own or have access to a certain set top box is an authorized user. Each set top box, as previously described, has a unique set top box identifier which may be, for example, a serial number. The set top box identifier is signed using a key that includes two parts. The first part of the key is specific to a particular set top box and is typically hard coded into the software of the set top box. The second part is sent over the transmission system and stored on the set top box.

During activation of the set top box, the user is presented with an activation code that includes the set top box identifier, a signature of the set top box identifier, and a random value or number. The user enters the activation code on the website and the website verifies the signature of the set top box identifier. If the website verifies the signature of the set top box identifier, then the random number is stored in the database maintained by the website and attached to each subsequent notification.

When the set top box receives a notification that is targeted to it's set top box identifier, the set top box also verifies the random number that was originally generated as part of the activation code. This protects against users that may try to send unauthorized notifications. In order to send an authorized notification, the user must have a signature of the set top box identifier, which is usually obtained if the user has physical access to the set to box. Also, the set top box can protect against unauthorized notifications because even if a user is able to determine the key used to sign the set top box identifier, that user does not have access to the random value or number that was generated as part of the activation code.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a system that broadcasts data over a one way transmission to a plurality of set top boxes, a method for remotely scheduling a task for implementation on a set top box, the method comprising steps for:
   providing program guide data to a user over a network, wherein the user requests a task from the program guide data that is provided to the user;
   receiving the task that was requested by the user from the program guide data;
   generating a notification from the requested task, wherein the notification includes task attributes and a set top box identifier;
   sending the notification to a notification service, wherein the notification service stores the notification in a task database;
   sending, by the notification service, the notification to a broadcast service, wherein the broadcast service sends the notification to the set top box over the one way transmission; and
   a step for verifying that the user has access to the set top box, wherein the step for verifying includes:
      providing an activation code to the website, wherein the activation code includes the set top box identifier, a signature of the set top box identifier and a random value;
      the website verifying the signature of the set top box identifier;
      including the random value in the notification if the signature is verified; and
      verifying the random value by the set top box.

2. A method as defined in claim 1, wherein the step for providing program guide data to a user over a network further comprises a step for storing the program guide data at a website, wherein the program guide data is obtained from a program guide data provider.

3. A method as defined in claim 1, wherein the step for providing program guide data to a user over a network further comprises a step for the user logging in to a website that stores the program guide data with a user identifier.

4. A method as defined in claim 3, wherein the step for providing program guide data to a user over a network further comprises a step for the mapping a user identifier to the set top box identifier such that the set top box identifier is included in the notification.

5. A method as defined in claim 1, wherein the step for generating a notification from the selected task further comprises an act of determining: a channel of the task; a time of the task; and a duration of the task.

6. A method as defined in claim 1, wherein the step for generating a notification from the selected task further comprises an act of determining the task attributes to be included in the notification, the task attributes including one or more of:
   an extension attribute that indicates how long the task should be extended;
   a keep attribute that identifies how long the task should be stored;
   an conflict resolution attribute for use in conflict resolution; and
   a reminder attribute that reminds the user of the task.

7. A method as defined in claim 1, wherein the step for sending the notification to a notification service further comprises inserting one or more of a set top box identifier, a sequence number, and a user identifier in the notification.

8. A method as defined in claim 1, wherein the step for sending the notification to the broadcast service is repeated by the notification service according to a schedule.

9. A method as defined in claim 8, wherein the act of providing program guide data to a user over a network, wherein the user requests a task from the program guide data that is provided to the user further comprises one or more of:
   requesting a cancel task;
   requesting a manual record task, wherein the user identifies a start time, an end time, and
   a channel to be recorded.

10. In a system that broadcasts programming content to a plurality of set top boxes over a one way transmission such as a satellite broadcast, a method for remotely scheduling a task over the one way transmission such that the task is implemented on a set top box that receives the programming content, the method comprising acts of:
    accessing program guide data that is stored on a website that is remote from the set top box;
    selecting a task using the program guide data that is provided from the website;
    after the task has been selected, generating a notification from the selected task, wherein a set top box identifier is inserted in the notification that includes the selected task;
    sending the notification, by the notification service, to a broadcast service, wherein the broadcast service transmits the notification to an uplink that delivers the notification over the one way transmission to the set top box;
    detecting, by the set top box, the set top box identifier included in the notification delivered over the one way transmission; and
    implementing the selected task at the set top box from the notification that was received over the one way transmission.

11. A method as defined in claim 10, wherein the act of selecting a task further comprises one or more of:

an act of selecting a record task;
an act of selecting a cancel task;
an act of selecting a manual record task, wherein the user selects a start time, an end time, and a channel to be recorded; and
an act of selecting a delete task.

12. A method as defined in claim 10, wherein the act of selecting a task further comprises an act of selecting task attributes, wherein the task attributes include one or more of:
an extension attribute that indicates how long the task should be extended;
a keep attribute that identifies how long the task should be stored;
an conflict resolution attribute for use in conflict resolution; and
a reminder attribute that reminds the user of the task.

13. A method as defined in claim 10, wherein the act of generating a notification from the selected task further comprises an act of inserting at least one of a user identifier and a sequence number in the notification.

14. A method as defined in claim 13, wherein the act of detecting, by the set top box, the set top box identifier included in the notification delivered over the one way transmission further comprises an act of discarding the notification if the notification in the notification has already been processed, wherein the notification has already been processed if the sequence number matches a previous sequence number of a previously processed notification.

15. A method as defined in claim 10, wherein the act of sending the notification to a broadcast service is repeated.

16. A method as defined in claim 15, wherein the act of sending the notification to a broadcast service is repeated using a predetermined schedule.

17. A method as defined in claim 10, wherein the act of detecting, by the set top box, the set top box identifier included in the notification delivered over the one way transmission further comprises an act of enabling the set top box to implement remotely scheduled tasks.

18. A method as defined in claim 10, wherein the act of detecting, by the set top box, the set top box identifier included in the notification delivered over the one way transmission further comprises an act of tuning the set top box to a particular portion of the one way transmission.

19. A method as defined in claim 10, further comprising a step for verifying the user, wherein the step for verifying the user comprises:
providing an activation code to the website, wherein the activation code includes the set top box identifier, a signature of the set top box identifier and a random value;
verifying the signature of the set top box identifier by the website;
including the random value in each notification if the signature is verified; and
verifying the random value by the set top box.

20. In a system wherein programming content is delivered over a satellite system to a plurality of set top boxes, a method of remotely scheduling a task on a set top box, the method comprising acts of:
selecting a task from program guide data that is retrieved from a remote website, including setting one or more attributes of the task;
from the selected task, generating a notification, wherein the selected task and the one or more attributes are included in the notification;
inserting a sequence number and a set top box identifier in the notification;
sending the notification to a notification service;
repeatedly sending the notification to a broadcast service by the notification service, wherein the broadcast service transmits the notification to an uplink such that the notification is included in a broadcast of the satellite;
tuning the set top box to a particular channel of the satellite broadcast;
detecting the task by recognizing the set top box identifier in the notification; and
scheduling the task at the set top box.

21. A method as defined in claim 20, wherein the act of selecting a task from program guide data further comprises an act of providing program data that is remotely accessible by an access device.

22. A method as defined in claim 20, wherein the act of selecting a task from program guide data further comprises an act of identifying the one or more attributes, wherein the one or more attributes include at least one of:
an extension attribute that indicates how long the task should be extended;
a keep attribute that identifies how long the task should be stored;
an conflict resolution attribute for use in conflict resolution; and
a reminder attribute that reminds the user of the task.

23. A method as defined in claim 20, wherein the act of repeatedly sending the notification to a broadcast service occurs at a predetermined schedule.

24. A method as defined in claim 20, wherein the act of detecting the task by recognizing the set top box identifier in the notification further comprises enabling the set top box to detect remotely scheduled tasks.

25. A method as defined in claim 20, wherein the act of scheduling the task at the set top box further comprises:
comparing the sequence number with previous sequence numbers of previously received notifications to determine if the task has already been scheduled; and
discarding the task if the task has already been scheduled.

26. A computer program product for performing the acts recited in claim 20.

27. In a system that includes programming content that is broadcast to a plurality of set top boxes over a one way transmission, a task service for remotely scheduling a task that is transmitted over the one way transmission to a set top box for implementation, the task service comprising:
a website that maintains program guide data, wherein the website provides the program data to a user that accesses the website with a user identifier such that the user selects a task;
a database that is accessible by the website and that stores set top box identifiers, wherein the website accesses the database to map the user identifier to a particular set top box identifier of the user;
a notification module for generating notifications, wherein the notification includes the task and the set top box identifier;
a notification service that receives the notifications from the notification module, wherein the notification service repeatedly sends each notification according to a schedule to a broadcast service such that the notifications are transmitted to the set top box over the one way transmission.

28. A task service as defined in claim 27, wherein the website provides the program guide data to the user over a network such as the Internet.

29. A task service as defined in claim 27, wherein the database is maintained by the website.

30. A task service as defined in claim 27, wherein the notification module or the website inserts the set top box identifier in the notification.

31. A task service as defined in claim 30, wherein the notification module or the website further inserts one or more of a sequence number and the user identifier in the notification, and wherein the notification module or the website inserts a random number in the notification when the user provides an activation code to the website.

32. A task service as defined in claim 27, wherein the notification is addressed to a group of set top boxes.

33. A task service as defined in claim 27, wherein the notification service sends new notifications before repeating previous notifications.

34. In a system that broadcasts data over a one way transmission to a plurality of set top boxes, a computer program product for implementing a method for remotely scheduling a task for implementation on a set top box, the computer program product comprising:
   a computer readable medium for carrying computer executable instructions for implementing said method, and wherein the method comprises steps for:
      providing program guide data to a user over a network, wherein a user requests a task from the program guide data that is provided to the user;
      receiving the task that was requested by the user from the program guide data;
      generating a notification from the selected task, wherein the notification includes task attributes and a set top box identifier;
      sending the notification to a notification service, wherein the notification service stores the notification in a database;
      sending, by the notification service, the notification to a broadcast service, wherein the broadcast service sends the notification to the set top box over the one way transmission.

35. A computer program product as defined in claim 34, wherein the step for providing program guide data to a user over a network further comprises a step for storing the program guide data at a website, wherein the program guide data is obtained from a program guide data provider.

36. A computer program product as defined in claim 34, wherein the step for providing program guide data to a user over a network further comprises a step for the user logging in to a website that stores the program guide data.

37. A computer program product as defined in claim 36, wherein the step for providing program guide data to a user over a network further comprises a step for the mapping a user identifier to the set top box identifier such that the set top box identifier is included in the notification.

38. A computer program product as defined in claim 34, wherein the step for generating a notification from the selected task further comprises an act of determining: a channel of the task; a time of the task; and a duration of the task.

39. A computer program product as defined in claim 34, wherein the step for generating a notification from the selected task further comprises an act of determining the task attributes to be included in the notification, the attributes including one or more of:
   an extension attribute that indicates how long the task should be extended;
   a keep attribute that identifies how long the task should be stored;
   a an conflict resolution attribute for use in conflict resolution;
   a destination attribute that identifies where the task occurs; and
   a reminder attribute that reminds the user of the task.

40. A computer program product as defined in claim 34, wherein the step for sending the notification to a notification service further comprises inserting one or more of a set top box identifier, a sequence number, and a user identifier in the notification.

41. A computer program product as defined in claim 34, wherein the step for sending the notification to the broadcast service is repeated by the notification service according to a schedule.

* * * * *